United States Patent

[11] 3,603,628

[72] Inventors Edward A. Smith
6641 W. 6th St., Los Angeles, Calif. 90048;
Robert L. Day, 1518 Grismer St.,
Burbank, Calif. 91501
[21] Appl. No. 839,429
[22] Filed July 7, 1969
[45] Patented Sept. 7, 1971

[54] FRAME CONNECTOR STRUCTURE
6 Claims, 9 Drawing Figs.
[52] U.S. Cl. .................................................... 287/189.36H,
287/54 C
[51] Int. Cl. .................................................... F16b 7/00
[50] Field of Search........................................ 287/54 A,
54 B, 54 C, 58 CT, 137, 189.36 H, 20.92 C;
24/131; 312/257

[56] References Cited
UNITED STATES PATENTS

| | | | |
|---|---|---|---|
| 2,762,639 | 9/1956 | Molter et al. | 287/54 A X |
| 3,033,598 | 5/1962 | Polgar | 287/54 A X |
| 3,239,255 | 3/1966 | Murcott | 287/58 CT |
| 3,272,582 | 9/1966 | Anderson et al. | 287/54 A X |
| 3,306,639 | 2/1967 | Lyon | 287/58 CT |
| 3,336,060 | 8/1967 | Bradford | 287/54 C |
| 3,472,539 | 10/1969 | Fenwick | 287/54 A |

FOREIGN PATENTS

| 551,421 | 1/1958 | Canada | 287/189.36 H |
|---|---|---|---|

Primary Examiner—David J. Williamowsky
Assistant Examiner—Wayne L. Shedd
Attorney—Flam and Flam ABSTRACT: A tubular frame element is telescoped over a bracket to which it is to be connected. The frame element has an aperture for receiving a latching projection. The projection is formed on a strip of spring steel held against the inside surface of the bracket. The strip has its opposite ends held by straps struck inwardly from the bracket. The strip is formed so that it may be assembled by inserting one end of the strip under one strap, then bowing the strip so that its other end is positioned to be received by the other strap, and then shifting the strip until the latching projection snaps into an aperture of the bracket whereby the strip is locked in place. The anchoring of the strip at places spaced closely on opposite sides of the projection provides a stiff spring action adequate to ensure against accidental release of the connector structure.

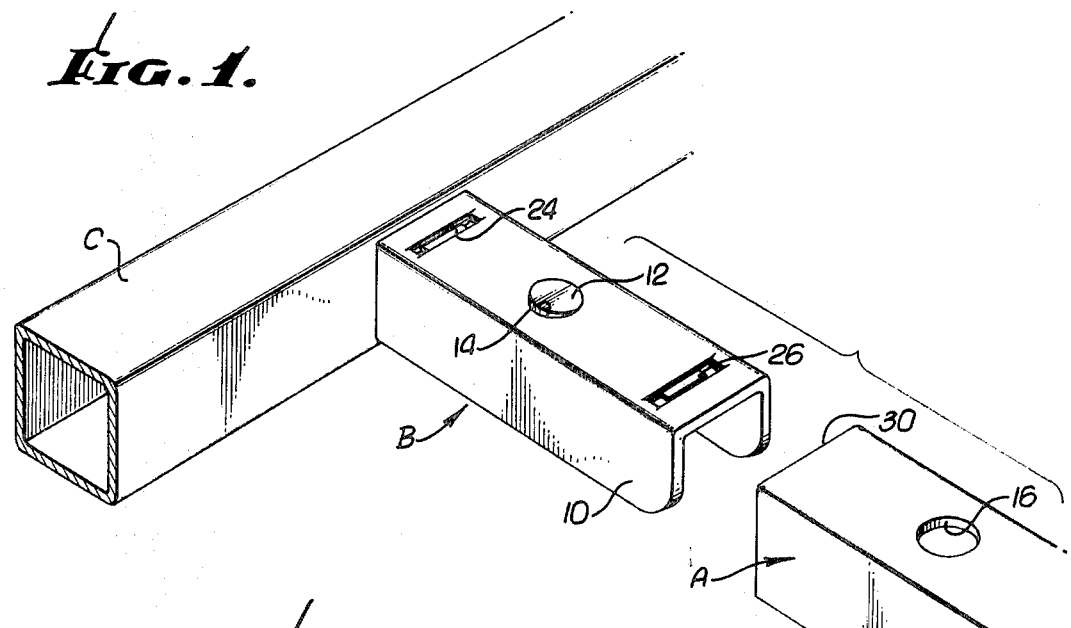
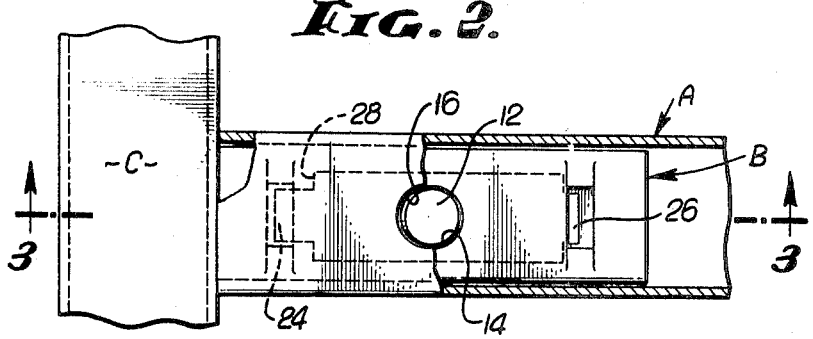
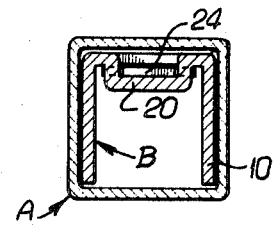
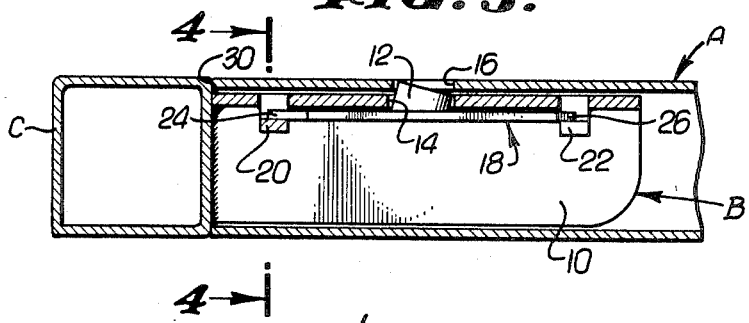
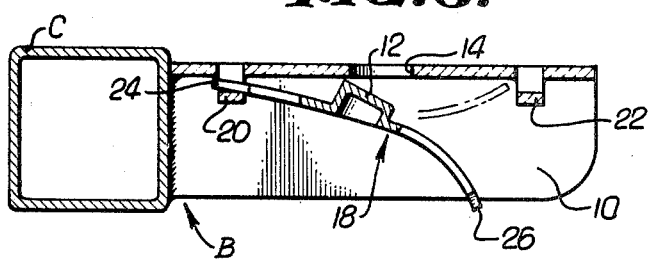

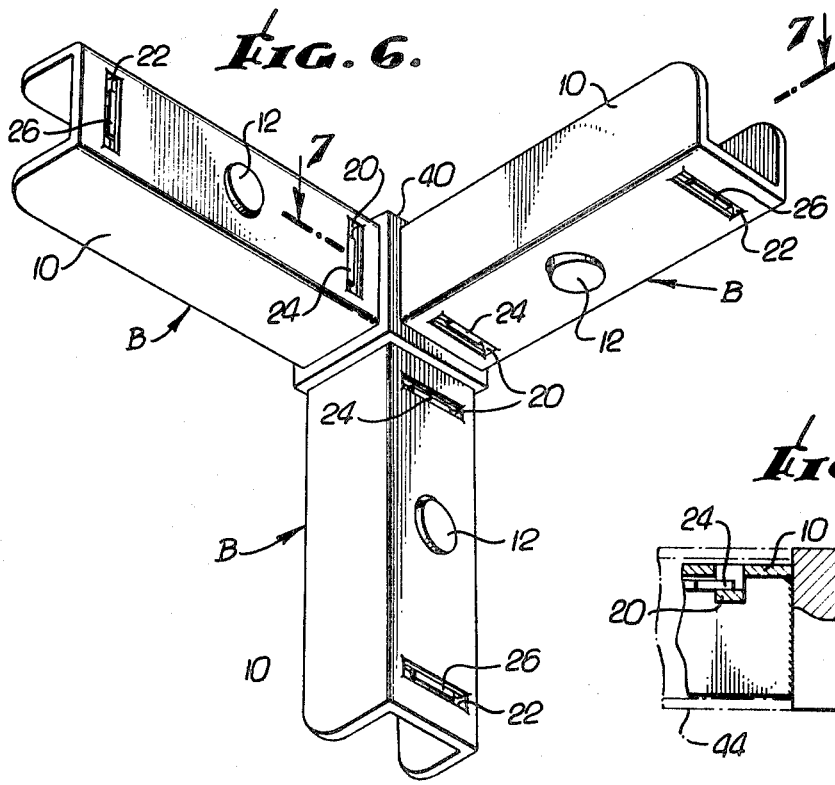
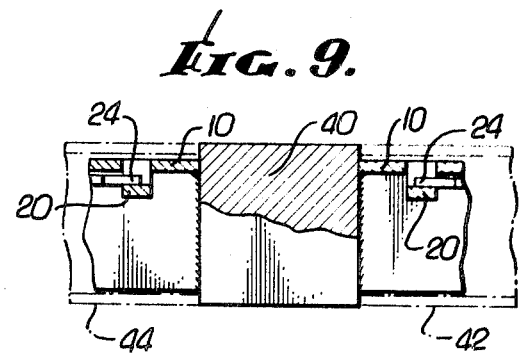
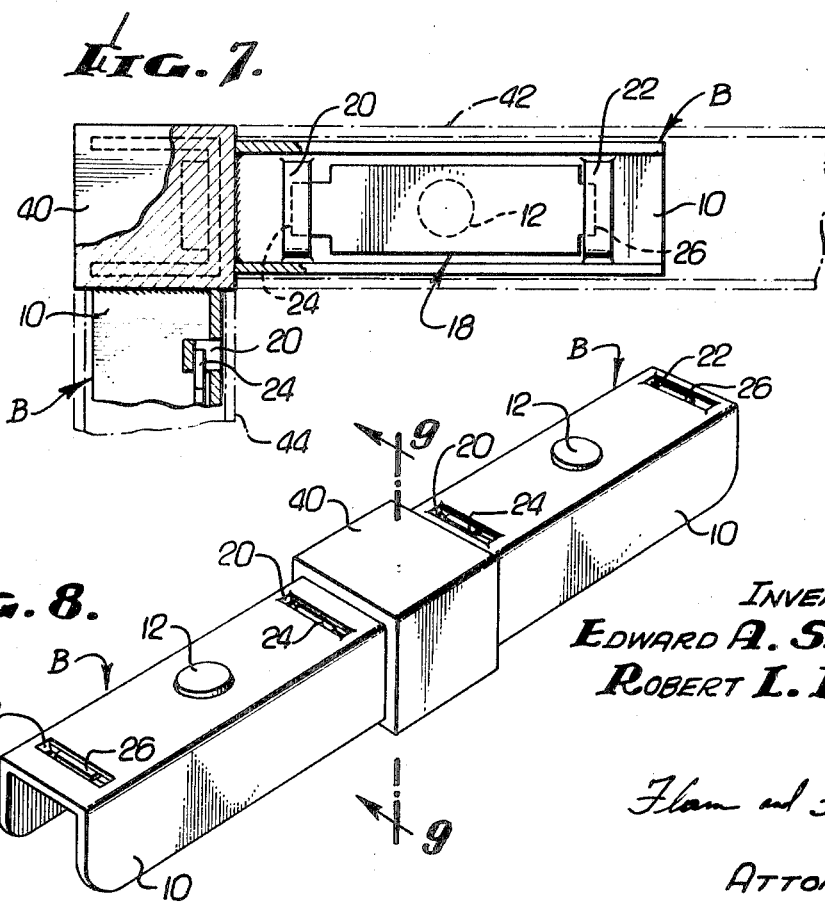
INVENTORS.
EDWARD A. SMITH
ROBERT L. DAY
Flam and Flam
ATTORNEYS.

FRAME CONNECTOR STRUCTURE

BACKGROUND OF THE INVENTION

This invention relates to connector structures for frame elements for use as parts of cabinets, racks, scaffolds or the like whereby the frame elements may be assembled at the site of use. More particularly this invention relates to connector structures of a type wherein locking results automatically upon telescopic movement of the frame elements over the locking device.

The primary object of the invention is to provide a connector structure that comprises a minimum number of parts. The primary objective of connector structures of this character is that the connector structures be of simple construction, easily operated and reliable in operation. One locking device heretofore proposed comprises a bowed strip of spring steel material flattened somewhat as it is inserted longitudinally into a hollow rectangular bracket. A projection at the crest of the bowed portion is moved into registry with an aperture of the hollow bracket so that the projection forms a detent engageable with an aperture in a frame element telescoped over the bracket. Though simple in terms of numbers of parts, and though easily operated, this structure has certain disadvantages. For example, unless very heavy gauge material is used, the spring is weak and hence the detent is easily dislodged from the aperture of the bracket that holds it in place and is easily dislodged from the aperture of the frame element upon which a locking relationship depends. Furthermore, the strip blocks the passage through the hollow frame element, which might be desirable for electrical wiring or the like.

The present invention is designed to provide a locking device that has no more parts than the prior art structure described and that is just as simple to assemble and just as simple to operate, but which provides a strong spring locking action with thin gauge material. The present invention is furthermore designed so that the passage through the hollow frame element is not blocked.

BRIEF SUMMARY OF THE INVENTION

In order to accomplish these objects, we provide a short strip of bowed spring steel material from the center of which a latching button or projection is formed. The strip has its opposite ends held by straps struck inwardly from the bracket. Ends of the strip are received beneath the straps with the projection extending through an aperture in the bracket to engage an aperture formed in the frame element telescoped over the bracket. For assembly, one end of the strip is inserted beneath one of the straps; the strip is then flexed until the other end is positioned to be received by the other strap; the strip is then shifted until the projection snaps into the bracket aperture. The stress is increased as the frame element cams the projection inwardly prior to arrival of the frame member to a position in which its latching recess is aligned with the projection.

BRIEF DESCRIPTION OF THE DRAWINGS

A detailed description of the invention will be made with reference to the accompanying drawings. These drawings, unless described as diagrammatic or unless otherwise indicated, are to scale. The description of the invention is of the best presently contemplated modes of carrying out the invention. This description is not to be taken in a limiting sense, but is made merely for the purpose of illustrating the general principles of the invention. Structural and operational characteristics attributed to forms of the invention first described shall also be attributed to forms later described, unless such characteristics are obviously inapplicable or unless specific exception is made.

FIG. 1 is an exploded fragmentary perspective view of a pair of frame members intended to be secured by the connector structure incorporating the present invention.

FIG. 2 is a fragmentary top plan view of the connector structure with the frame member latched, a portion of the apparatus being broken away and shown in section.

FIG. 3 is a sectional view taken along the plane indicated by line 3—3 of FIG. 2.

FIG. 4 is a transverse sectional view taken along the plane indicated by line 4—4 of FIG. 3.

FIG. 5 is a sectional view similar to FIG. 3, but illustrating the manner in which the detent is assembled.

FIG. 6 is a pictorial view of a connector structure having three locking devices whereby three frame elements may be connected together in mutually right angle relationship at a corner.

FIG. 7 is a fragmentary sectional view taken along a plane corresponding to line 7—7 of FIG. 6.

FIG. 8 is a pictorial view of a connector structure having two aligned locking devices whereby frame elements may be connected together in still another configuration.

FIG. 9 is a fragmentary sectional view taken along a plane corresponding to line 9—9 of FIG. 8.

DETAILED DESCRIPTION

A tubular frame element A (FIG. 1) is adapted to be telescoped over a locking device B. The locking device includes a support bracket in the form of a channel 10 that fits closely (FIG. 4) into the frame element A to restrain the frame element against movement laterally of the bracket 10. Restraint against movement longitudinally of the bracket is provided by a circular projection 12 (FIG. 1) that is spring pressed outwardly of an aperture 14 in one of the walls of the bracket. This frame element A has a circular latching recess 16 designed to receive the latching projection 12.

In the present instance one end of the channel 110 is attached to the side of a frame element C that may be made of the same tubular stock material as the element A. For this purpose the channel 10 is welded along the inside of the channel so as to provide a sturdy arrangement without interference with the frame element telescoped over the channel. Accordingly, the frame element A is positioned as a brace for the element C. This arrangement is representative of other possible anchoring relationships. For example, the bracket could be attached to the end of a frame element whereby one frame element forms a detachable extension of another. Optionally, the bracket 10 could provide longitudinally spaced projections 12 for like detachable connections to such frame elements at opposite ends. The bracket 10 could be supported in an upright position in a concrete deck to form an anchor for rails or the like. Numerous other arrangements are possible.

The projection 12 is part of a spring element 18. The spring element is made from a strip of spring steel material. The projection 12 is formed intermediate the length of the strip by a suitable metal-forming process. The spring steel material has a normally bowed configuration with the projection 12 at the outside of the bowed portion.

The ends of the spring element 18 are fitted beneath straps 20 and 22 (FIG. 3) struck from the wall of the channel 10 in which the spring element is anchored. The spring element 18 is assembled in a manner indicated in FIG. 5. One end 24 of the spring element 18 is inserted into the strap 20 with the projection positioned to interfere with the edges about the aperture 14 at the side near the strap 24. The other end 26 of the spring element 18 is then flexed as indicated in phantom lines so as to be aligned for reception by the strap 22. The spring element 18 is then shifted to the right as viewed in FIG. 5. As the projection 12 snaps into position, the spring end 26 slides under the strap. The ends of the spring element are reduced primarily to minimize the size of the opening that must be provided by the straps. However, the shoulder 28 (FIG. 2) at the end 24 serves as a stop (FIG. 5) signalling that the opposite end 26 is positioned to be moved into registry with the strap, and the shifting movement required for assembly is minimized.

The straps 20 and 22 hold the spring element substantially straight and thus stress it. A substantial spring force thus opposes inward movement of the projection 12.

The tool forming the projection 12 is designed so that the flat outer surface of the projection projection slopes with the edge of the surface near the distal end of the channel 10 flush with the edge of the channel aperture 14 and the surface near the proximal end of the channel elevated by an amount substantially equal to the thickness of the material of the frame element A. Accordingly, the edge 30 (FIG. 1) of the frame element A cams the projection 12 inwardly upon telescoping movement only to the extent necessary ultimately to achieve the interlock. Thus as shown in FIG. 3, when the parts are assembled, the requisite interference is provided to prevent reverse movement of the frame element A. In this assembled relationship the projection 12 does not project beyond the outer surface of the frame element A which might cause interference with companion structure or accidental operation.

In order to release the lock, any suitable tool can be placed on the surface of the projection and a force exerted to cause the edge of the aperture 16 to be freed from its interference fit. The flat surface of the projection ensures against the tool slipping away, and at the same time provides a substantial bearing area. When the lock is so released, the straps 20 and 22 keep the element in position.

In the form shown in FIGS. 6 and 7 the connector structure includes three locking devices B identical to the locking devices previously described. The locking devices are welded to three faces of cube 40. As shown in FIG. 7, the edges of the cube are sized to correspond to the outside dimensions of the frame elements 42 and 44. Accordingly, a corner structure results in which the ends of the frame elements fit together perfectly.

The channels 10 of the locking devices B open towards the outside of the corner so as to facilitate welding of the locking devices B to the cube. Correspondingly, the projections 12 are located on the inside of the corner whereby they are suitably concealed.

A variety of connector structures can be formed to provide whatever configuration may be desirable. Thus, as shown in FIGS. 8 and 9, the cube 40 mounts the locking devices B on opposite sides. Frame elements connected to the locking devices are rigidly connected together in alignment.

We claim:

1. A hollow, unit handled, self-locking connector structure adapted to be closely telescopically received within a hollow apertured frame member to form a rigid joint therewith and a substantially unimpeded passage therethrough, comprising; a rigid hollow support having an aperture in a wall thereof, a substantially flat spring metal strip mounted at opposite ends thereof to the inner surface of said wall in substantial face to face engagement therewith on opposite sides of said aperture; an integral locking projection extending outwardly from a medial portion of said substantially flat spring metal strip and extending through said operature; and the outer end of said locking projection including a cam surface positioned for camming engagement by assembly of an outer telescoping apertured frame member whereby said medial portion of said spring metal strip will be deflected during telescopic assembly of the joint and resume the substantial face to face engagement with said inner wall surface upon entry of the locking projection into an aperture in the telescoped frame member and whereby the hollow interior of the joint will be substantially unimpeded.

2. The connector structure of claim 1 wherein said substantially flat spring metal strip is highly stressed by the mounting at opposite ends thereof in substantial face to face engagement with said inner surface of said wall.

3. The connector structure of claim 2 wherein said spring metal strip is normally bowed in its unstressed condition 4. The connector structure of claim 2 wherein the mounting for the opposite ends of said substantially flat spring metal strip comprises a pair of straps integral with said wall.

5. The connector structure of claim 4 wherein said straps comprise struck-out portions of said wall; and stop means adjacent opposite ends of said spring metal strip for engaging said struck-out portions during assembly of the connector.

6. The connector structure of claim 1 wherein the outermost end of said cam surface on said locking projection extends outwardly of the aperture in said wall a distance not exceeding the wall thickness of a frame element to be assemble therewith.